United States Patent Office 3,169,949
Patented Feb. 16, 1965

3,169,949
PROCESS FOR THE POLYMERIZATION OF VINYL CHLORIDE WITH A CATALYST MIXTURE OF TRIALKYL ALUMINUM AND BORIC ACID TRIALKYL ESTER AND A COCATALYST
Robert Büning, Troisdorf, Bezirk Cologne, Germany, assignor to Dynamit Nobel Aktiengesellschaft, Troisdorf, Bezirk Cologne, Germany, a German corporation
No Drawing. Filed Sept. 25, 1961, Ser. No. 140,207
Claims priority, application Germany, Dec. 30, 1960, D 35,086
13 Claims. (Cl. 260—92.8)

The present invention relates to a process for the polymerization of vinyl chloride and more particularly to such a process wherein the polymerization of vinyl chloride is carried out in the presence of a catalyst mixture of an organo-aluminum compound and a boric acid ester and a co-catalyst consisting of a chlorine-containing organic compound and/or a sulfur-containing organic compound.

The polymerization of vinyl chloride with organo-metallic compounds as polymerization catalysts, in the conventional manner, leads to the formation of polymerizates which have better structural stability at higher temperatures than polymerizates which are produced according to conventional methods in the absence of organo-metallic catalysts. A variety of organo-metallic compounds has been proposed as polymerization catalysts for polymerizing vinyl chloride. Among the organo-metallic compounds, organo-aluminum compounds have found wide application since they are easily obtained and show particular advantages in industrial applications.

In the co-pending U.S. application Serial No. 140,208, filed simultaneously herewith, of the same inventor as that herein, an improved process for the polymerization of vinylchloride is disclosed which comprises effecting the polymerization of vinyl chloride in the presence of a catalyst mixture of an organo-aluminum compound and a boric acid ester. In this manner, much better space-time-yields are obtained than could be obtained in the catalytic polymerization of vinyl chloride carried out in the conventional manner using only an organo-aluminum compound as polymerization catalyst. Furthermore, no pressure is needed where said catalyst mixture is employed. Preferably, the catalytic polymerization in accordance with said co-pending application may be carried out with the additional presence of an oxidation agent such as sulfur, nitrogen tetroxide, nitrogen dioxide, halogen, and the like. The oxidation agent serves to accelerate the polymerization reaction still further; however, polymerization products are obtained which do not always possess the desired molecular weight K-values.

It is an object of the present invention to overcome the foregoing drawbacks and to provide a process for the polymerization of vinyl chloride using in addition to a catalyst mixture of an organo-aluminum compound and a boric acid ester, a co-catalyst including a chlorine-containing organic compound and/or a sulfur-containing organic compound.

Other and further objects of the invention will become apparent from a study of the within specification and accompanying examples.

It has been found, in accordance with the present invention that an efficient polymerization of vinyl chloride may be carried out to obtain polymerizates of specifically desired molecular weight K-values. This is achieved by carrying out the polymerization of the vinyl chloride monomer in the presence of a catalyst mixture of an organo-aluminum compound and a boric acid ester as well as a co-catalyst selected from the group consisting of a chlorine-containing organic compound and a sulfur-containing organic compound, and thereafter recovering from the reaction product the polymerizate formed.

Thus, the present invention contemplates the substitution of chlorine-containing and/or sulfur-containing organic compounds for the oxidation agents optionally used in connection with the catalyst mixture of said co-pending application. In this connection, the chlorine-containing and/or sulfur-containing organic compounds which may be used in accordance with the invention include, for example, methyl-chloromethylether, polythioformaldehyde, i.e. trithiane, and diallylsulfide. These co-catalysts are particularly advantageous by reason of their polyfunctional effect. Besides their co-catalytic action, these materials also function as regulators. More specifically, for example, by changing the concentration of these co-catalytic compounds, polyvinyl chlorides may be produced in a simple matter having different K values with respect to molecular weight.

It is true tht molecular weight regulators have been described in the past, but these do not also function as co-catalysts. Furthermore, the known regulators become incorporated into the polyvinyl molecule since in these regulator compounds one deals with unsaturated halogen-containing monomers. While these compounds may be useful for certain purposes, of course, they are not always desirable.

While the polyfunctional co-catalysts in accordance with the invention include diallylsulfide which is an unsaturated monomer, this compound is active in such small concentrations as a co-catalyst with the aforementioned catalyst mixture that a unipolymerizing is practically unnoticeable in the over-all reaction. Significantly, the diallylsulfide is used in accordance with the invention in approximately an amount by weight of $10^{-5}$ parts per part by weight of vinyl chloride monomer, preferably with a tolerance of about 200%. Stated another way, the ratio by weight of diallylsulfide to vinyl chloride may be approximately 0.00001:1, with a plus or minus error of 200%. Accordingly, polymerization products may be obtained having industrially desirable molecular weight K value between 60–70.

The ratios by weight of polythioformaldehyde and methyl-chloromethylether to vinyl chloride monomer may be greater than the ratio by weight of the diallylsulfide to vinyl chloride as noted above. However, in the case of polythioformaldehyde, the amount by weight of this compound which may be used as co-catalyst is governed by its solubility properties.

The organo-aluminum compound which may be used in accordance with the present invention may include any aluminum trialkyl, including aluminum triloweralkyl, such as the trimethyl, triethyl, tripropyl, tributyl, triisobutyl, and the like, while the boric acid ester may be a boric acid trialkyl ester, including boric acid triloweralkyl ester, such as the trimethyl ester, triethyl ester, tripropyl ester, tributyl ester, triisobutyl ester, triallyl ester, triisooctyl ester and mixtures thereof; the catalyst mixture may be present in a solvent such as one slected from the group consisting of aliphatic hydrocarbons, aromatic hydrocarbons, normal ethers and cyclic ethers, such as tetrahydrofuran and dioxan. The catalyst mixture may be suitably prepared by combining the organo-aluminum compound and boric acid ester and heating at a temperature between about 40 and 70 degrees C. although higher temperatures may be used, under the exclusion of moisture and oxygen.

The adding of the cocatalysts in accordance with the invention may take place by first adding the same to the vinyl chloride monomer before the addition of the catalyst mixture of organo-aluminum compound and boric acid ester. Alternatively, a direct addition of the cocatalyst to the catalyst mixture before the polymerization is also possible, as well as the combination of the cocatalyst with either of the components of the catalyst mixture, i.e, the organo-aluminum compound or the boric acid ester, prior to the combining with the remaining components of such mixture.

While the molar ratio of the organo-metallic compound and the boric acid ester may vary within wide limits, i.e. 0.25–8:1, the molar ratio of the organo-aluminum compound with respect to the chlorine and/or sulfur-containing organic cocatalyst used must be greater than 1. Stated another way, the molar ratio of the chlorine-containing organic compound and/or the sulfur-containing compound to the organo-aluminum compound should be smaller than 1 and preferably smaller than 0.1, i.e. a ratio of about 0.1:1.

The over-all polymerization is effectively carried out at a temperature between minus 30 degrees C. and the boiling point of vinyl chloride without the need for added pressure.

The following examples are set forth for the purpose of illustrating the present invention, and it is to be understood that the invention is not to be limited thereto:

EXAMPLE 1

After drying over molecular sieves, such as zeolite, 200 grams of vinyl chloride are cooled to minus 20 degrees C. and treated with a solution of 5 mg. of diallylsulfide in 5 cc. of tetrahydrofuran. While stirring the ingredients and excluding air and moisture, the catalyst used is added. The catalyst is prepared as follows:

1.0 gram of aluminum triethyl is dissolved in 25 cc. of absolute tetrahydrofuran, treated with 2.5 grams of boric acid trimethyl ester and thence heated for 15 minutes to 55 degrees C. After a polymerization time of 1.5 hours, using the so-prepared catalyst, the polymerizate formed is separated from the liquid contents of the reaction mixture by centrifuging, thereafter washed with liquid vinylchloride and then dried in vacuum at room temperature. A yield of 68 grams of polymerizate is obtained in this manner, having a K-value of 65.

Where the foregoing procedure of Example 1 is repeated using 30 mg. of bromine as oxidation agent in 10 cc. of absolute petroleum ether, instead of 5 mg. of diallylsulfide in 5 cc. of tetrahydrofuran, in accordance with the invention, then the K-value of the resulting polymerizate amounts to 88.

EXAMPLE 2

In a suitable reaction vessel 200 grams of vinyl chloride are cooled to minus 20 degrees C., the vinyl chloride having been dried in accordance with the procedure of Example 1. To this is added a catalyst prepared in the following manner:

1.0 gram of aluminum triethyl is dissolved in 25 cc. of tetrahydrofuran and 30 mg. of polythioformaldehyde are added. After the polythioformaldehyde has gone into solution, the reaction mixture obtained is heated for 15 minutes to 50 degrees C. upon the addition of 2.5 grams of boric acid trimethyl ester. Using the catalyst prepared in the foregoing manner, after a polymerization time of 1.5 hours, 71 grams of a polymer are obtained having a K-value of 60.

EXAMPLES 3–6

The catalyst for each of these examples is prepared in the manner described in Examples 1 and 2 for 1.0 gram of aluminum-triethyl, 25 cc. of absolute tetrohydrofuran and 2.5 grams of boric acid trimethylester. The catalyst obtained in this manner is used in each of Examples 3–6 by adding the same in each instance to 200 grams of vinyl chloride (dried in accordance with the procedure of Example 1). The vinyl chloride is maintained at minus 20 degrees C. and already contains a predetermined quantity of methyl-chloromethyl ether. The polymerization is carried out in each of the Examples 3–6 to 1.5 hours. The results are summarized in the following table, wherein under X appears the quantity of methyl-chloromethyl-ether in grams, the same being contained in 200 grams of vinyl chloride in each case.

Table

| Example | X in gms. | Yield in gms. (of polyvinyl chloride) | K-value (of polyvinyl chloride) |
|---|---|---|---|
| 3 | 0.5 | 62 | 72 |
| 4 | 1.0 | 74 | 70 |
| 5 | 5.0 | 68 | 64 |
| 6 | 15.0 | 63 | 60 |

All operations in the examples are carried out in a nitrogen atmosphere. For determination of the K-value, see: H. Fikentscher, Cellulose-chemie 13, 60 (1932).

What is claimed is:

1. Process for the polymerization of vinyl chloride which comprises effecting the polymerization of vinyl chloride in the presence of a catalyst mixture of an aluminum-triloweralkyl compound and a boric acid-triloweralkyl ester and a cocatalyst selected from the group consisting of methyl-chloromethyl ether, trithiane, and diallyl sulfide, and recovering the polymerizate formed from the reaction product.

2. Process according to claim 1 wherein the molar ratio of the aluminum-triloweralkyl compound to the boric acid-triloweralkyl ester is between about 0.25–8:1, and the molar ratio of the cocatalyst to the aluminum-triloweralkyl compound is a positive value smaller than 1.

3. Process according to claim 2 wherein the polymerization is carried out at a temperature between about −30° C. and the boiling point of vinyl chloride.

4. Process according to claim 3 wherein the molar ratio of said cocatalyst to the aluminum-triloweralkyl compound is a positive value smaller than 0.1:1.

5. Process according to claim 4 wherein the cocatalyst is diallyl sulfide, said diallyl sulfide being present in an amount of the about $10^{-5}$ parts by weight per part of monomer vinyl chloride.

6. Process according to claim 3 wherein said catalyst mixture is prepared by combining the aluminum-triloweralkyl compound and the boric acid-triloweralkyl ester, and heating at a temperature between about 40–70° C. under the exclusion of moisture and oxygen.

7. Process according to claim 6 wherein the catalyst mixture is present in a solvent therefor.

8. Process according to claim 7 wherein said solvent is tetrahydrofuran.

9. Process according to claim 7 wherein said solvent is dioxan.

10. Process according to claim 3 wherein the cocatalyst is admixed with the vinyl chloride prior to the admixing with said catalyst mixture.

11. Process according to claim 3 wherein the cocatalyst is admixed with said catalyst mixture prior to the admixing with the vinyl chloride.

12. Process according to claim 3 wherein the aluminum-triloweralkyl compound is aluminum-triethyl.

13. Process according to claim 3 wherein the boric acid-triloweralkyl ester is boric acid-trimethyl ester.

References Cited in the file of this patent

FOREIGN PATENTS 669,346    Great Britain _____ Apr. 2, 1952

OTHER REFERENCES

Kawai et al.: J. Chem. Soc., Japan, 80, pp. 776–9, 1959 (see Chem. Abs., vol. 55, p. 3111g–i).

Ashikari: J. Poly. Sci. 28, pp. 641–2, 1958.

Schildknecht: Polymer Processes, p. 40, Interscience, N.Y. (1956).

Walker: Formaldehyde, 2nd edition, pp. 191–2, Reinhold, New York (1953).

UNITED STATES PATENT OFFICE
CERTIFICATE OF CORRECTION

Patent No. 3,169,949                      February 16, 1965

Robert Büning

It is hereby certified that error appears in the above numbered patent requiring correction and that the said Letters Patent should read as corrected below.

In the heading to the printed specification, line 10, for "Dec. 30, 1960" read -- Dec. 31, 1960 --; column 2, line 58, for "slected" read -- selected --; column 3, line 65, for "for" read -- from --; line 66, for "tetrohydrofuran" read -- tetrahydrofuran --; column 4, line 40, strike out "the"; line 44, for "lkyl" read -- alkyl --.

Signed and sealed this 29th day of June 1965.

(SEAL)
Attest:

ERNEST W. SWIDER                                    EDWARD J. BRENNER
Attesting Officer                                          Commissioner of Patents